O. K. HARRY.
LAND ROLLER.
APPLICATION FILED JULY 31, 1908.
No. 905,179.
Patented Dec. 1, 1908.
2 SHEETS—SHEET 1.
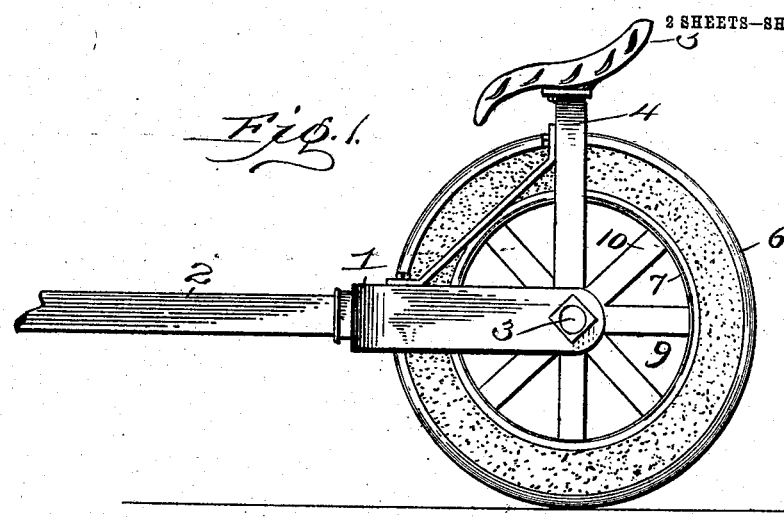
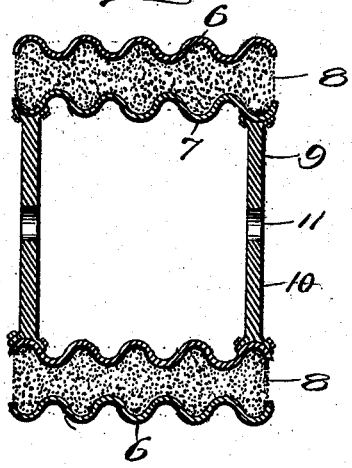
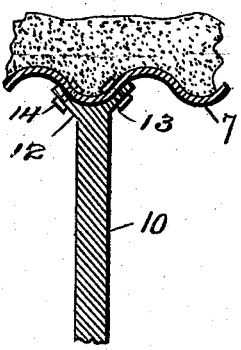

O. K. HARRY.
LAND ROLLER.
APPLICATION FILED JULY 31, 1908.
905,179.
Patented Dec. 1, 1908.
2 SHEETS—SHEET 2.
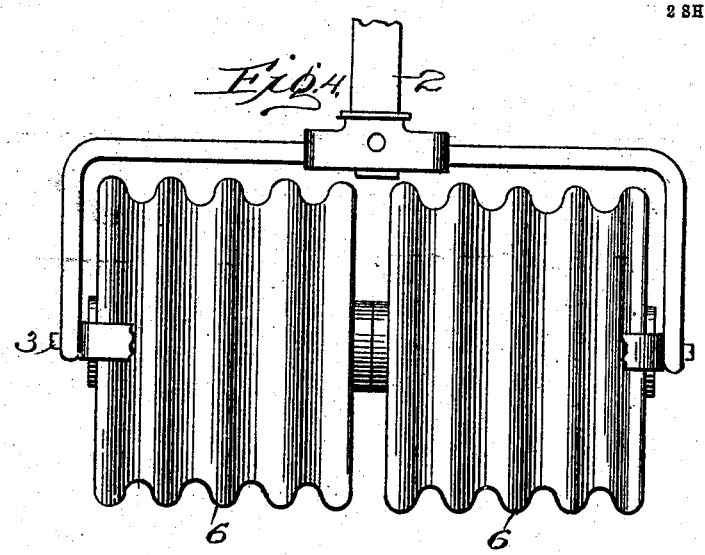
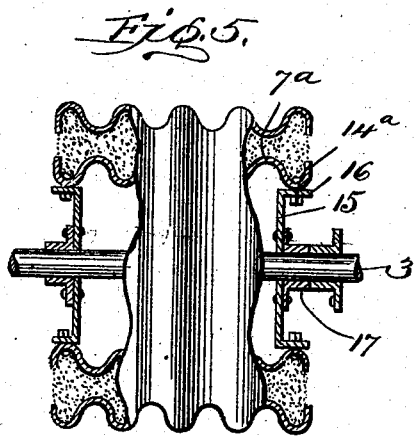
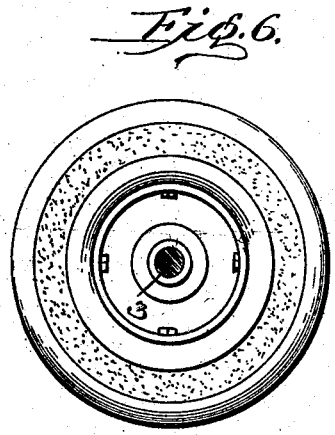

UNITED STATES PATENT OFFICE.

OWEN K. HARRY, OF DALLAS, TEXAS.

LAND-ROLLER.

No. 905,179.	Specification of Letters Patent.	Patented Dec. 1, 1908.

Application filed July 31, 1908. Serial No. 446,354.

*To all whom it may concern:*

Be it known that I, OWEN K. HARRY, a citizen of the United States, residing at Dallas, in the county of Dallas and State of Texas, have invented certain new and useful Improvements in Land-Rollers; and I do hereby declare the following to be a full, clear, and exact description of the invention, such as will enable others skilled in the art to which it appertains to make and use the same.

This invention relates to land rollers, and the object of the invention is to provide a roller having a corrugated outer rim which is secured in position solely by a bonding material inserted while in plastic condition between such outer rim and the inner rim which may also be formed with a corrugated surface.

With this object in view the invention consists of the novel construction hereinafter fully described and claimed.

In the accompanying drawings: Figure 1 is a side elevation of the device. Fig. 2 is a transverse section of one of the rollers. Fig. 3 is a detail view showing the manner of connecting the end castings to the inner corrugated rim. Fig. 4 is a view in elevation showing two rollers mounted on the same shaft. Fig. 5 is a view partly in section of one of the rollers constructed in a slightly different manner. Fig. 6 is an elevation of the roller shown in Fig. 5.

Referring to the drawings in detail, 1 indicates a framework in which the rollers are mounted, 2 the tongue, 3 the main axle, and 4 the support for the driver's seat 5. In the construction of the rollers proper, I employ, preferably, an outer corrugated rim 6 and an inner corrugated rim 7, these rims being separated by a suitable filling material which is inserted in plastic form and which when it has become hard forms a part of the body portion corresponding to the felly of a wheel. Secured to each end of the roller is a casting 9 formed with the spokes 10, and provided with a central aperture 11, constituting a bearing for the axle 3. The outer ends of the spokes are provided with laterally projecting members 12 and 13 which are concaved on their inner surfaces to conform to the surface of one of the corrugations of the rim 7 and are secured to said rim by means of bolts 14.

It will be observed that the outer corrugated rim 6 of the roller serves to leave the surface of the ground over which it is passed with grooves or shallow furrows, while the inner corrugated rim provides greater rigidity with the use of a given amount of metal, or a plate of given thickness. The corrugations serve to hold the cement or other plastic material in position and such plastic material constitutes the sole support of the outer rim 6.

In the modification shown in Fig. 5 the rim is formed in substantially the same manner, but the end members by means of which the roller is mounted on the main axle are formed of disk-like members 15 having outwardly-turned flanges 16, the latter being bolted to the inner rim 7ª by means of bolts 14ª. Secured to members 15 are sleeves 17 which project outwardly far enough to prevent the edges of the rollers from contacting when two rollers adjoin each other on the same shaft.

What I claim is:

1. In a land roller, an outer rim having a corrugated surface and a bonding material connecting the rim with the roller proper.

2. In a land roller, an outer rim having a corrugated surface, an inner rim formed on the roller proper, and a bonding material connecting the said rims.

3. In a land roller, a roller proper having a rim of corrugated material, an outer rim encircling the rim first-mentioned, and a bonding material connecting the rims.

4. In a land roller, a roller proper having a rim of corrugated material, a second rim having a corrugated surface encircling said rim, and means for connecting said rims.

5. In a land roller, a roller proper having a rim of corrugated material, members supporting said rim, said members provided with curved outer ends conforming to the corrugations of the rim, an outer rim having a corrugated surface, and means for connecting the two rims.

6. In a land roller, a roller proper having a rim of corrugated material, members for supporting said rim, devices on the ends of said members provided with curved faces conforming to one of the corrugations of the rim, an outer rim encircling the rim first-mentioned, and a bonding material connecting the two rims.

7. In a land roller, a main frame, an axle journaled therein, a roller mounted on said axle, said roller consisting of supporting members adapted to contact with the axle, a rim secured to said members, an outer rim encircling the rim first-mentioned and formed with a corrugated surface, and a bonding material located between the two rims.

8. In a land roller, a supporting frame, an axle journaled therein, a roller mounted on the axle, said roller consisting of members adapted to contact with the axle, said members formed with devices having outer, concaved surfaces, a rim connecting said members, provided with corrugations engaging the concaved surfaces, an outer rim of corrugated material, and a bonding material supporting the outer rim.

In testimony whereof I affix my signature in presence of two witnesses.

OWEN K. HARRY.

Witnesses:
J. B. ADONE,
J. B. ADONE, Jr.